Figure 14:
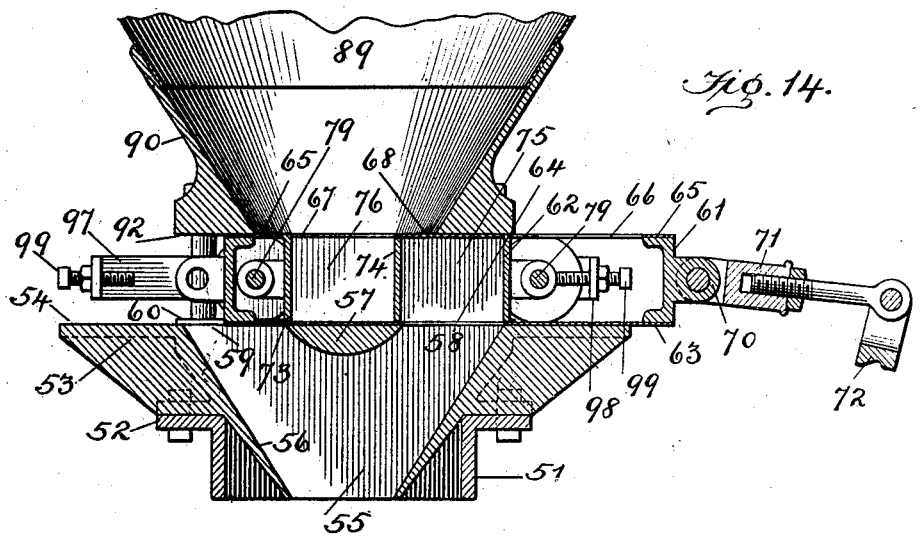

C. H. AYARS.
CAN FILLING MACHINE.
APPLICATION FILED JULY 3, 1906.
944,354.
Patented Dec. 28, 1909.
7 SHEETS—SHEET 1.
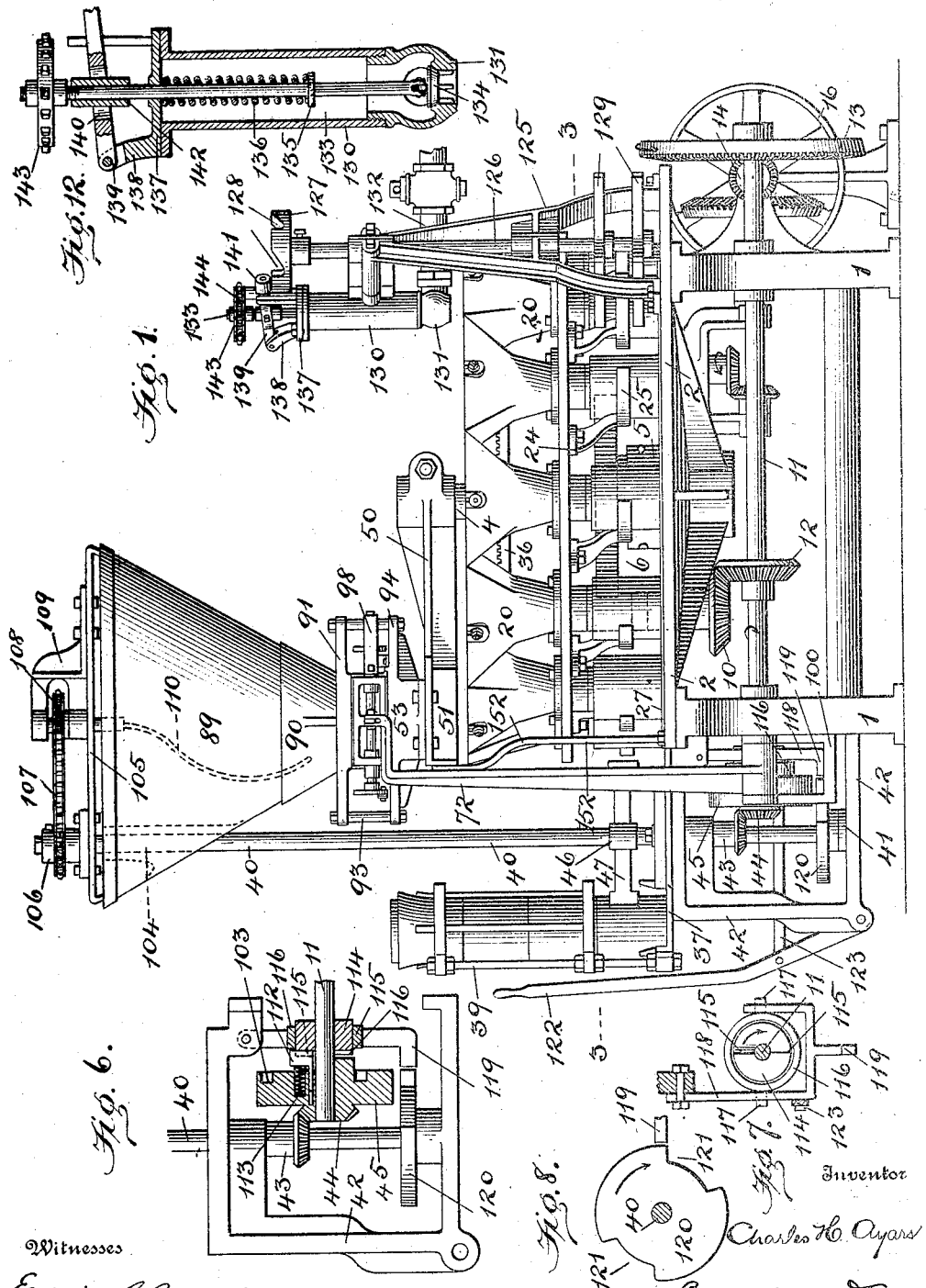
Witnesses
Edwin L. Bradford
J. Ferdinand Vogt
Inventor
Charles H. Ayars
By Munn & Co,
Attorneys

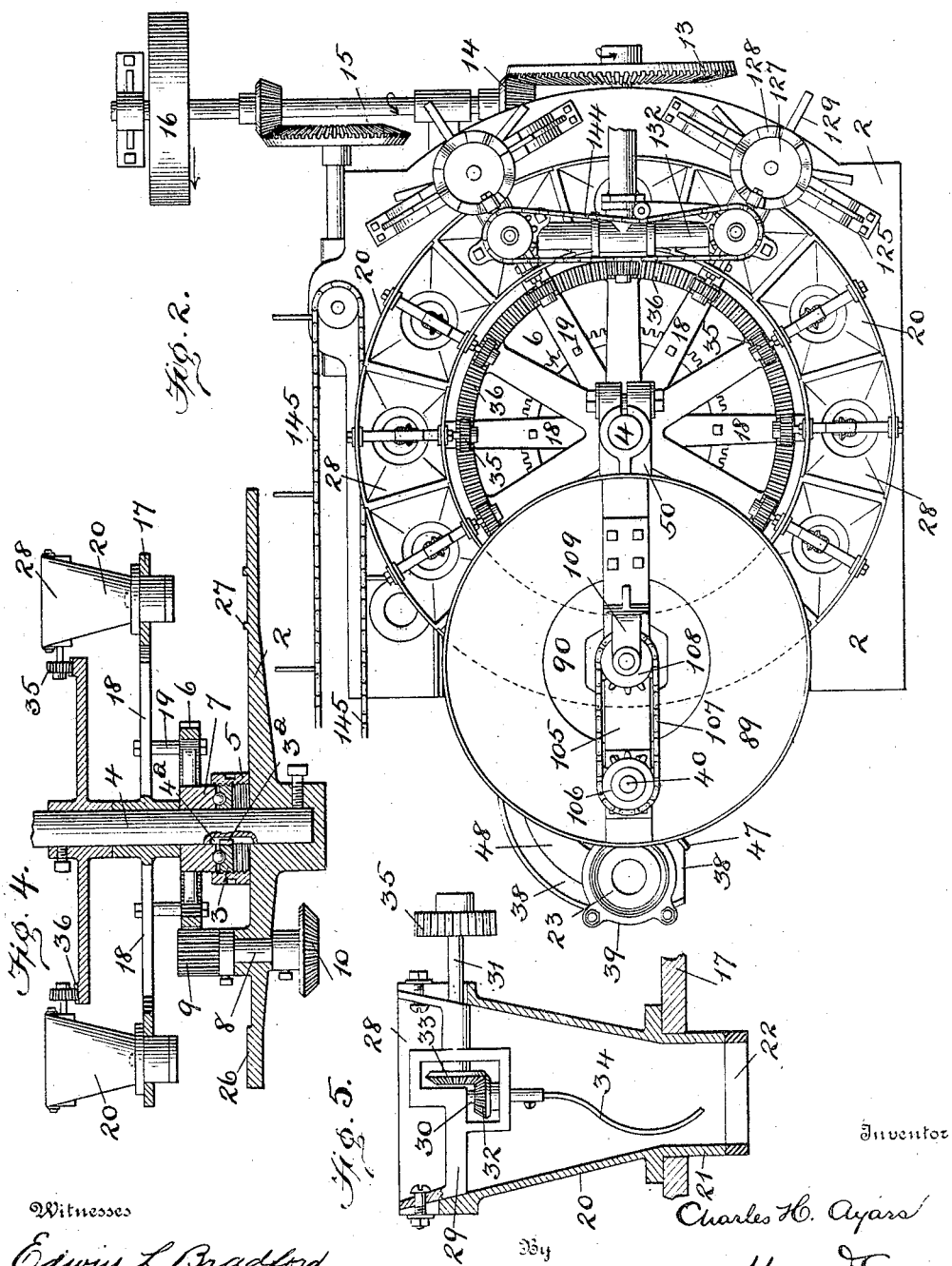

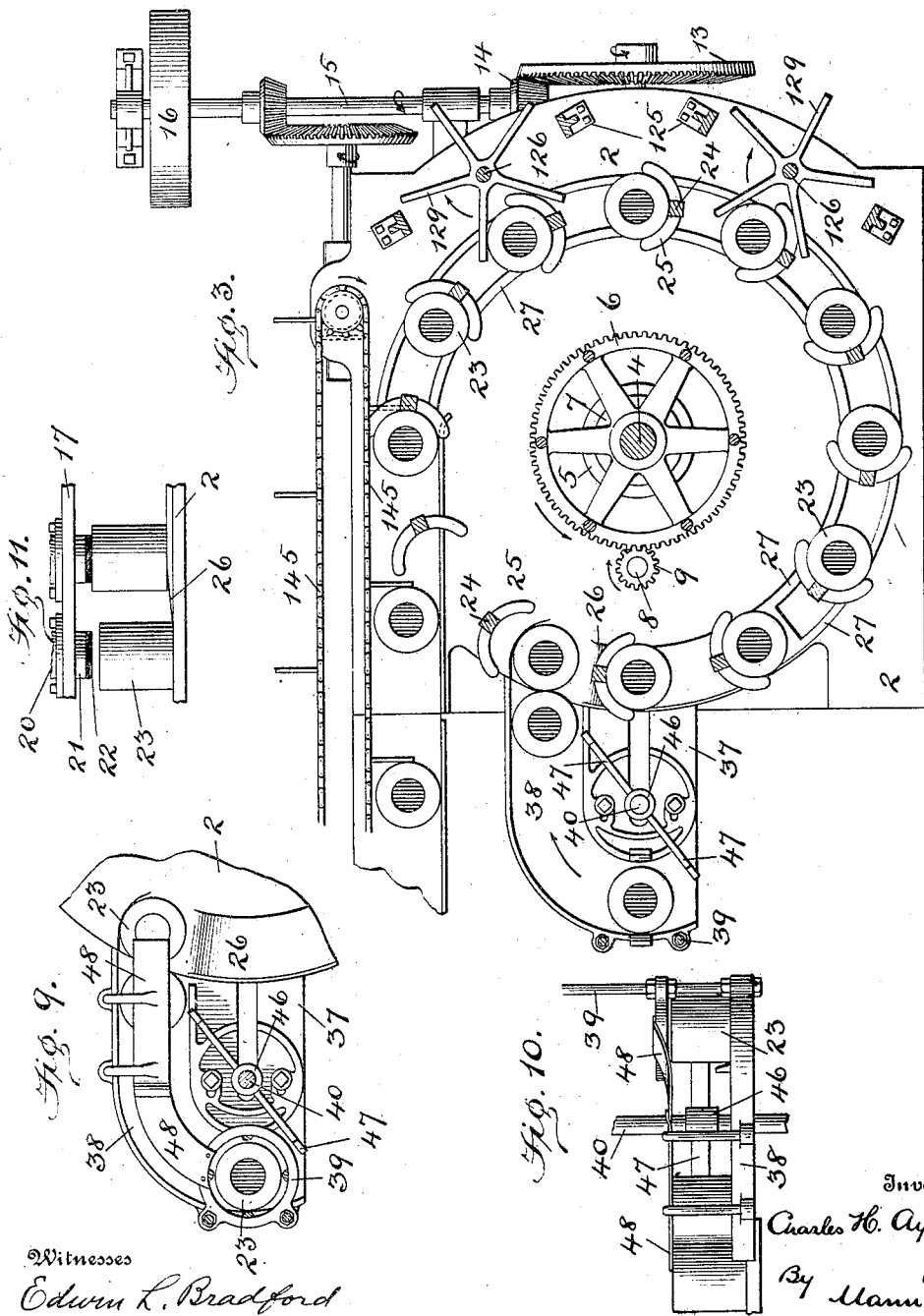

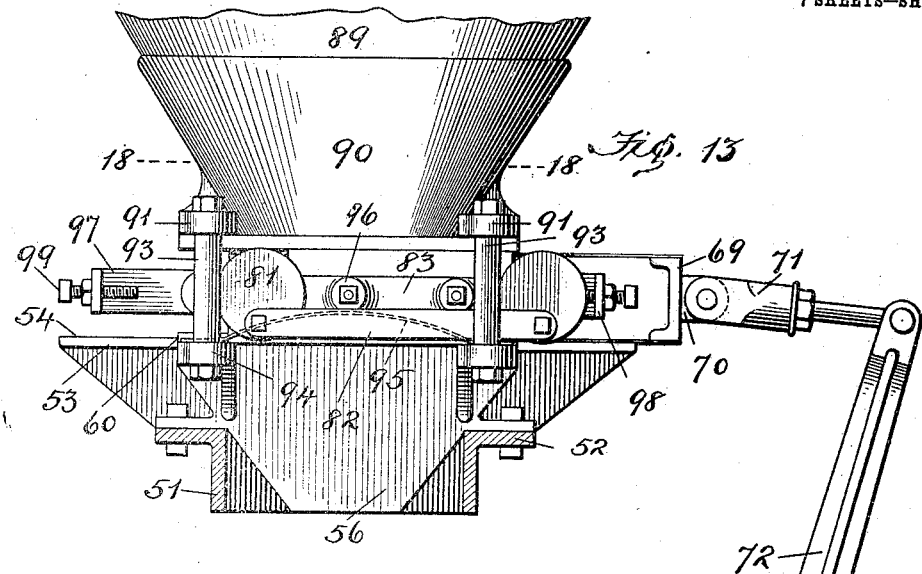
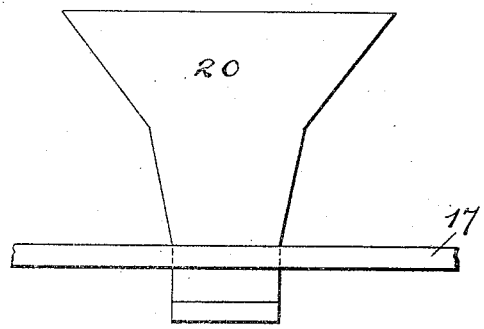
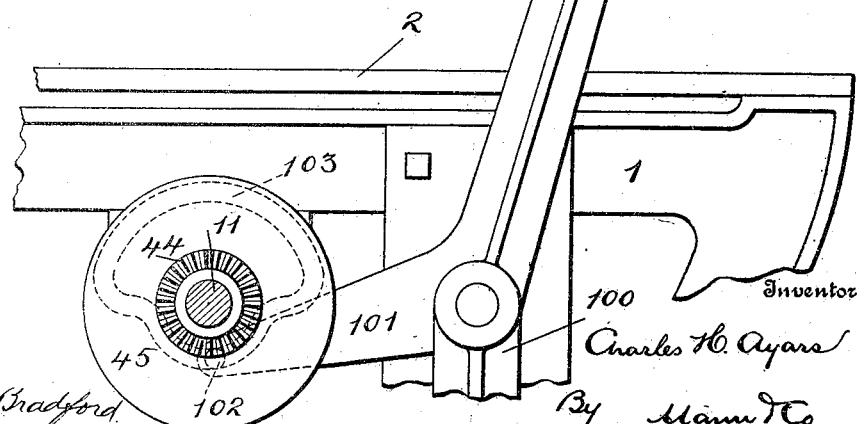

C. H. AYARS.
CAN FILLING MACHINE.
APPLICATION FILED JULY 3, 1906.

944,354.

Patented Dec. 28, 1909.
7 SHEETS—SHEET 5.

Witnesses
Edwin L. Bradford
G. Ferdinand Vogt.

Inventor
Charles H. Ayars
By
Mann & Co,
Attorneys

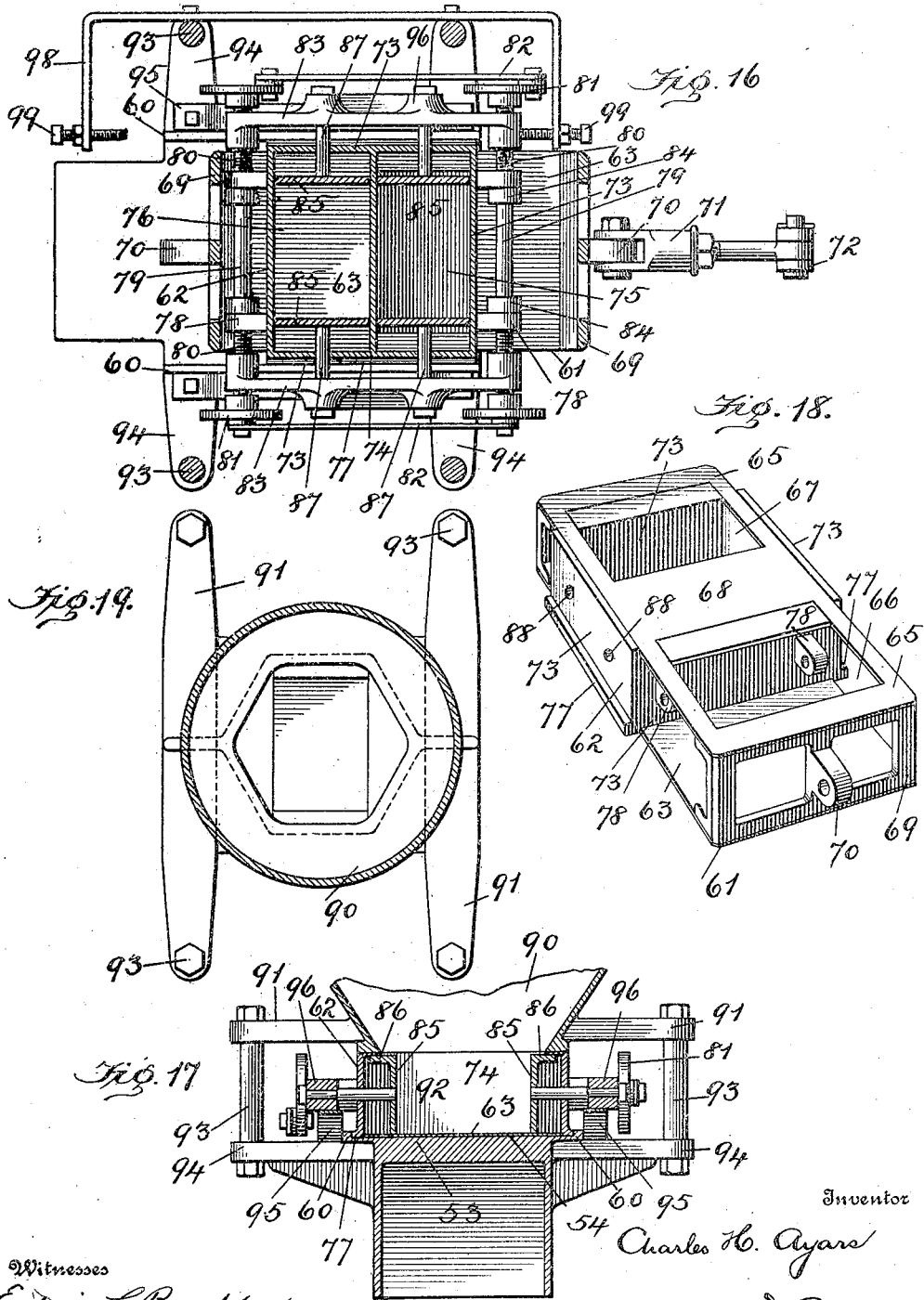

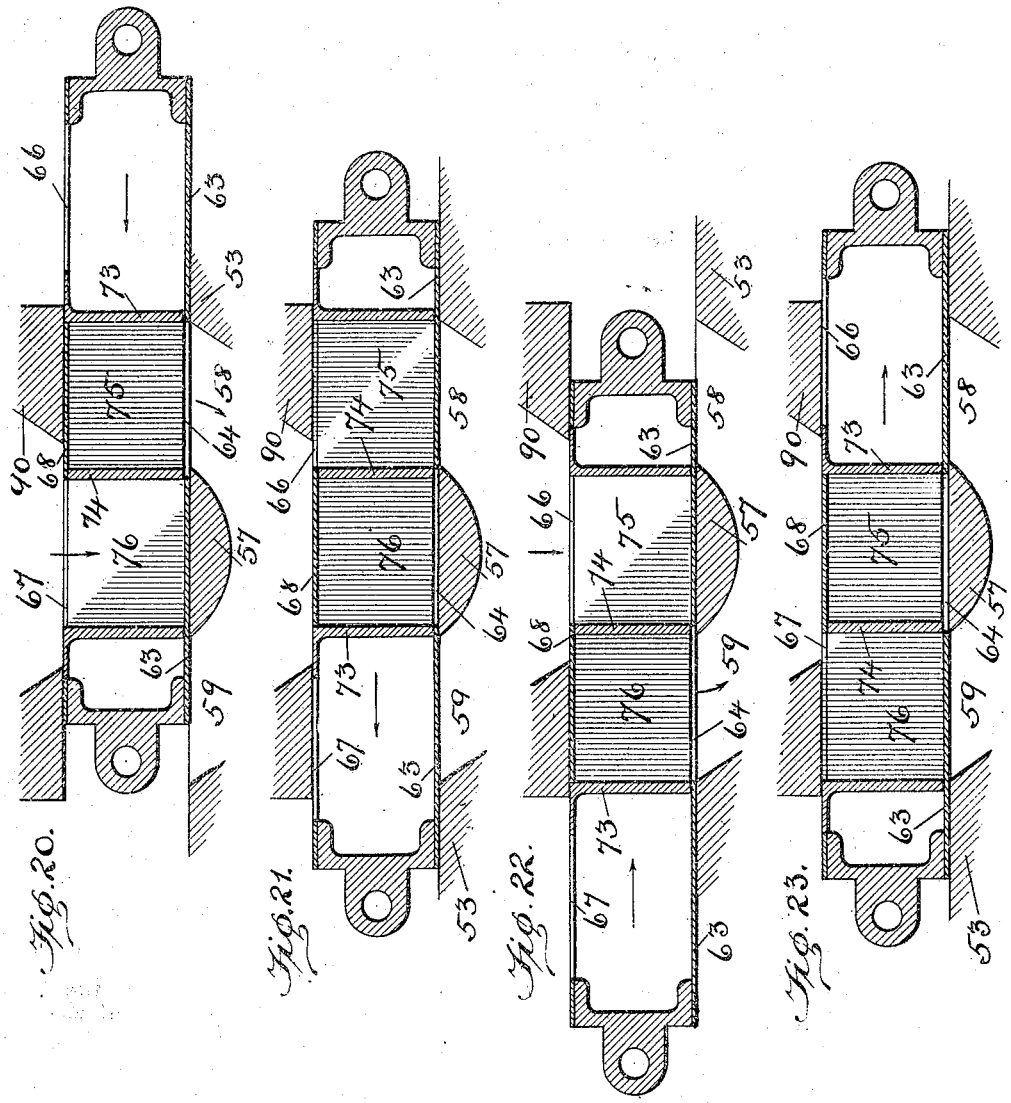

UNITED STATES PATENT OFFICE.

CHARLES H. AYARS, OF SALEM, NEW JERSEY, ASSIGNOR TO AYARS MACHINE COMPANY, OF SALEM, NEW JERSEY, A CORPORATION OF NEW JERSEY.

CAN-FILLING MACHINE.

944,354.

Specification of Letters Patent. Patented Dec. 28, 1909.

Application filed July 3, 1906. Serial No. 324,588.

*To all whom it may concern:*

Be it known that I, CHARLES H. AYARS, a citizen of the United States, residing at Salem, in the county of Salem and State of New Jersey, have invented certain new and useful Improvements in Can-Filling Machines, of which the following is a specification.

This invention relates to improvements in can-filling machines and while a machine constructed in accordance therewith may be employed to fill other receptacles with various materials the machine illustrated in the drawing is especially useful in canning peas, beans, berries and the like.

Some of the objects of the invention are to provide an improved construction of machine, which will be continuous in its operation, so as to enable the cans to be filled rapidly without waste or injury to the peas; to accurately measure the quantity to be deposited in each can; to measure and deposit a predetermined quantity of brine or other liquid for each can; to provide a measuring device which may be adjusted to vary the quantity of peas for each can according to the size of the can, and to generally improve the construction of machines for this purpose and enable it to be used in filling cans of various sizes or heights.

Figure 15:
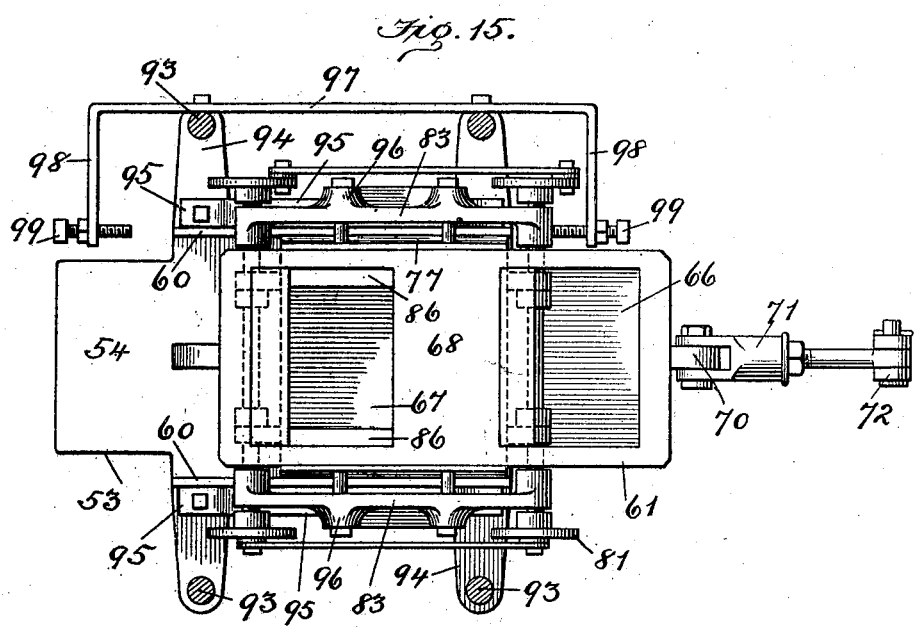

The invention is illustrated in the accompanying drawings, in which:

Figure 1, illustrates a side elevation of the machine. Fig. 2, a plan view of the same. Fig. 3, a sectional plan view,—the section being taken on the line 3—3 of Fig. 1. Fig. 4, a central vertical section through the individual hopper carrier. Fig. 5, a vertical section through one of the individual hoppers. Figs. 6, 7 and 8 details of the cans and clutch devices for controlling the operation of the measuring device. Figs. 9 and 10, a plan and rear detail views respectively of the devices for feeding and guiding the empty cans into position to be filled. Fig. 11, a detail view of the inclined surface for seating the cans and sealing them against the bottom of the individual hoppers. Fig. 12, a vertical section through the liquid-measuring valve. Fig. 13, a detail view showing in elevation the lower end of the main hopper, the measuring device and the lever and cam for operating the latter. Fig. 14, a vertical section through the lower end of the main hopper and measuring devices. Fig. 15, a plan view of the detached measuring device. Fig. 16, a sectional plan view through the measuring device to show the adjustable walls therein. Fig. 17, a vertical section of the same. Fig. 18, a perspective view of the measuring device. Fig. 19, a sectional plan view of the lower or discharge end of the main hoper,—the section being taken on the line 18—18 of Fig. 13, and Figs. 20, 21, 22 and 23 diagrammatic views showing the several positions of the measuring device.

Referring to the drawings by numerals, 1, designates the vertical legs or supports on which a stationary horizontal table, 2 rests. A central post, 4, extends vertically from the table and said post is provided with a vertical groove, $4^a$. A support or collar, 3, loosely surrounds the post but connected thereto by a feather, $3^a$, which coacts with the groove, $4^a$, in the post. This feather enables the collar to be moved vertically on the post but prevents its rotation thereon. The exterior or circumference of the collar is provided with screw-threads which are engaged by screw-threads on an outer inclosing ring, 5. This inclosing ring seats on the table and by turning it thereon the collar, 3, will be made to move vertically on the post. The upper surface of the collar is provided with a circular channel in which a series of anti-friction devices such as balls travel.

A gear, 6, has a hub, 7, which turns on the post and said hub seats and turns on the balls on the collar, 3. A short vertical shaft, 8, also has bearing in the table and the upper end of this vertical shaft carries a pinion, 9, while the lower end, which projects beneath the table is provided with a bevel gear, 10. A horizontal shaft, 11, is supported in suitable bearings beneath the table and this shaft carries a bevel gear, 12, which meshes with and drives the gear, 10, on the lower end of the vertical shaft, 8, and the outer end of said horizontal shaft is provided with a large bevel gear, 13, which is driven by a pinion, 14, on the inner end of a horizontal driving shaft, 15. A main driving pulley, 16, is provided on the outer end of the shaft, 15, and motion is imparted to all the working parts of the machine from this pulley.

Above the gear, 6, and centered around the vertical post or support, 4, is a horizontal circular carrier, 17. This carrier is provided with a plurality of arms, 18, which radiate from a central hub, and vertical pins, 19, rigidly connect said arms with the horizontal gear, 6, so the carrier and gear will be revolved together.

A plurality of individual hoppers, 20, are mounted on the carrier, 17, and these hoppers are arranged with their lower discharge ends, 21, projecting below the carrier and the lower end of each hopper is provided with a gasket or ring, 22, of suitable yielding material to enable the open end of the can, 23, to be sealed by being forced up against said gasket.

Brackets, 24, are bolted on the bottom of carrier and project downwardly therefrom and the lower ends of these brackets are provided with laterally or horizontally-projecting curved arms, 25, which are designed to contact with the vertical wall of the cans and push them forward over the table, as clearly seen in Figs. 1 and 3. At the feed-in point the surface of the table is flat and the cans are thus deposited on this flat surface with their open-ends uppermost and in the path of the curved arms, 25, which travel with the carrier. As these arms engage the wall of the can and the latter begins to move forward, its bottom will be transferred from the flat surface of the table onto an inclined surface, 26, as seen in Figs. 3, 9 and 11, and as the forward movement of the can continues it, the can, will gradually be slightly elevated so as to force its upper or open end up against the gasket, 22, on the lower end of one of the hoppers, leaving the opening of the can in communication or register with the hopper-opening. After the can is properly seated against the bottom of the hopper it will then pass beyond the said inclined surface and be sustained slightly above the table by parallel rails, 27, so as to reduce the friction between the bottom of the can and its support.

The hoppers, 20, are arranged continuously around the carrier with their upper flared ends, 28, in contact with each other so as to leave no opening or space between them through which material from the main hopper may fall and be wasted. Each individual hopper is provided at its large end with a horizontal frame, 29, in which a vertical shaft, 30, and a horizontal shaft, 31, have bearing. Both of these hopper shafts have gears, 32, and, 33, respectively which mesh so that by revolving the horizontal shaft, 31, the vertical shaft, 30, will also be revolved. A curved stirrer arm, 34, is carried on the vertical shaft, 30, and said arm depends from the shaft and revolves in the lower discharge-end of the hopper as shown in Fig. 5. The outer end of each horizontal hopper-shaft, 31, carries a pinion, 35, by means of which said shaft is to be revolved as the hopper travels in a horizontal plane.

A stationary circular rack, 36, is supported on the vertical posts, 4, above the carrier, and the diameter of this rack is such as to enable the pinions, 35, to mesh therewith as they travel with the hoppers thereby giving an orbital movement to the vertical shafts, 30, and stirrer arms, 34.

The mechanism for feeding the cans onto the table and beneath the individual hoppers will now be described. At one side the machine is provided with a shelf or platform, 37, whose upper or top surface is flush with the flat top surface of the stationary table, 2. This shelf or platform is provided with a curved can guideway, 38, which directs the cans as they are pushed forward onto the table in front of the inclined surface, 26. A chute, 39, is sustained by and projects vertically above the platform, 37, and the lower end of this chute opens directly over the guideway, 38, so that the cans passing down through the chute, will drop one after another in succession into the guideway and then be pushed forward. At one side of the chute and between the latter and the table there is a vertical shaft, 40, which passes through the platform and projects both above and below the latter. The lower end of this shaft seats in a bearing, 41, on a horizontal bar of a bracket or frame, 42, and above said bearing the shaft carries a bevel gear, 43, which meshes with and is driven by a similar gear, 44, at the side of a clutch-wheel, 45, both of which are on the inner end of the horizontal shaft, 11. A can-feed device is mounted on the vertical shaft, 40, above the platform and said feed-device comprises a central hub, 46, and laterally or horizontally-projecting arms, 47. Each of these arms is of such length as to project over the guideway, 38, when revolved, and in passing beneath the chute will contact with and push the lowermost can out and convey it into and partly through the guideway and leave it at the edge of the table, 2, as clearly seen in Fig. 9. In order to prevent the cans from traveling by momentum as the arms, 47, leave them I provide a brake device comprising a flat plate, 48, which extends in a direction parallel with the guideway and above the latter so as to frictionally engage the tops of the cans as they travel through said guide-way and prevent them from traveling farther than the arms of the feed device will push them. In the operation of the machine one can will always remain in the guide-way adjacent the table, 2, and as the next can is pushed forward by one of the arms it will contact with and push the can ahead of it onto the table and in the path of the curved arms, 25. It will be understood that the cans are fed continuously one after another, through the guideway and onto the table and that they are then seated up against the lower ends of the individual hoppers which latter will receive the material from a main hopper and then discharge it into the cans as they are conveyed over said table.

The mechanism and devices coacting with the main hopper to measure the material and discharge it into the individual hoppers will now be described. At the upper end, the post or support, 4, carries a horizontal frame, 50, which is clamped rigidly thereto and projects laterally over the circular row of individual hoppers, as shown in Fig. 1. At its outer end this frame, 50, is provided with a rectangular support, 51, having lateral flanges, 52, and said support is open at the top and bottom, as can be seen in Figs. 13 and 14 and for a purpose to be presently described. It is on this latter frame that the main hopper and measuring devices are supported. Suitable brace rods, 152, (see Fig. 1) are employed to steady and aid in the support of the frame, 51. On top of the frame and resting on the flanges, 52, of the latter is a horizontal table, 53, whose top surface, 54, is flat and smooth. This table has a hopper-like opening, 55, (see Fig. 14) whose walls, 56, are inclined downward and project into the opening of the frame, 51. A horizontal stationary bar, 57, extends centrally across the opening, 55, and forms two side openings, 58, and, 59, and the top surface of this bar is flush with the top surface of the table. Two guide-ribs, 60, are provided on the top surface of the table—one at each side of the opening, 55, and these ribs extend across said table surface in a direction at right angles to the bar, 57.

The measuring device which reciprocates over the top of the table and between the latter and the main hopper will now be described, reference being made particularly to Figs. 13 to 18 inclusive. This measuring device comprises two movable boxes or receptacles, 61, and, 62,—one within the other and both of which are movable between the main hopper and the table, 53. The outer box, 61, is a frame-like structure with a bottom, 63, having a central opening, 64, and a top, 65, with two openings, 66, and, 67, one at each side of a center plate, 68. It will thus be understood that the center plate, 68, of the top is directly over the center opening, 64, of the bottom and serves as a cut-off. The two parallel sides of this frame, 61, are both open, as plainly seen in Fig. 17, and the two ends, 69, of the frame are provided with a laterally-projecting lug, 70, to which a link, 71, and an operating bar, 72, are connected. The object in providing lugs on both ends of the frame is merely to enable the frame to be reciprocated from either end or reversed if desired. It is to be understood that the outer frame-like box rests on top of the table, 53, and slides horizontally thereon over the openings, 58, and, 59, and also over the bar, 57. The central position of the bottom opening, 64, of the frame is such that when the latter is at one end of its stroke, as in Fig. 14, said opening, 64, will register with the opening, 58, in the table, while the opening, 67, in the top of the frame will have position directly over the bar, 57. The inner box, 62, which in reality is the measuring device, has four vertical walls, 73, and a central vertical partition, 74, which extends in a direction cross-wise or at right-angles with respect to the direction in which the box and outer frame reciprocate. This measuring device is open both at the top and bottom and its vertical walls slide in close contact with the bottom of the outer frame. The central partition of this box forms two compartments, 75, and, 76, within the outer vertical walls, 73. Laterally-projecting bottom lugs, 77, are provided on opposite sides of the measuring device, 62, and serve to prevent lateral movement of the frame, 61, beneath the box. These lugs also contact with and slide against the guide-ribs, 60, on the top surface of the table and prevent lateral movement of the measuring device while it is being reciprocated. Lugs, 78, are provided on opposite ends of the measuring box, 62, and horizontal shafts, 79, extend loosely through said lugs and have threaded outer ends, 80. The extreme outer ends of these shafts are each provided with a circular plate or disk, 81, rigidly connected thereto so that the disks and shafts may be turned together. A connecting rod or bar, 82, is provided at each end of the shafts and these bars connect the two disks at said end. By this arrangement the turning of the shaft at one end of the measuring box will cause the shaft at the opposite end also to turn a like distance. This rotary movement of the shafts is availed of to alter the size of the interior of the measuring box, as will now be described. Horizontal bars, 83, extend along opposite sides of the measuring box, 62, and each of these bars is provided with a circular end through which the threaded end, 80, of the shafts extend and have threaded engagement. As these bars are sustained by the two shafts, the turning of the latter will cause the bars to move or travel thereon and be moved toward or away from the side of the measuring box according to the direction in which the shafts are turned. It will be understood that the shafts, 79, have no longitudinal movement through the lugs and are held against such movement by collars, 84.

On the interior of the measuring box and at opposite sides of each compartment, 75, and, 76, are movable vertical walls, 85, the upper edges of which are provided with horizontal flanges, 86, as clearly seen in Fig. 17. These walls, 85, at opposite sides of each compartment are designed to be moved toward each other in order to reduce the size of the compartment or to be moved from each other to enlarge said compartments. In order to effect this I have provided each movable wall, 85, with a horizontal stem, 87, which projects through an opening, 88, in the outer wall, 73, of the measuring-box and the outer end of each stem is rigidly connected to one of the bars, 83, so that as the said bar is moved toward or away from the measuring box by the rotation of the shafts, 79, the movable walls, 85, whose stems are connected to said bars will be moved like a piston in the compartments. It will also be seen that as the bars, 83, are provided at opposite sides of the measuring box the rotation of the shafts will cause all the movable walls in the compartments to simultaneously move in the direction desired. The main hopper, 89, has its lower end secured in a circular casting, 90, which latter has parallel bars, 91, at its lower end and the bottom surface, 92, of this casting is smooth and extends parallel with the top surface of the horizontal table, 53. Posts or supports, 93, project from lateral arms, 94, on the table, 53, and serve to support the circular casting and hopper immediately over the measuring devices.

It has heretofore been explained that the bar, 72, causes a reciprocation of the box or frame, 61, and also the measuring box, 62. In this connection it is to be understood that when the compartment, 76, of the measuring box is in register or communication with the main hopper above it, as seen in Figs. 14, and 20 to 23, said compartment is either filled or being filled, while the compartment, 75, registers with the opening, 58, and is discharging its measured contents. While the outer frame and inner box are in this position some means must be provided to hold the inner box stationary or at rest while the outer frame makes preliminary movement sufficient to cause it to accomplish two things, to-wit; 1st, close communication between the main hopper and the filled compartment, 76, and 2nd, to close the bottom of the empty compartment, 75. This is accomplished by the cut-off plate, 68, at the top and the plate, 63, at the bottom both moving forward before the inner box moves and said inner box makes no movement whatever until this preliminary cut-off movement of the frame is completed.

In order to hold the inner box at rest during the partial or preliminary movement of the cut-off frame, I provide plate-springs, 95,—one at each side of the inner measuring box, which springs have their ends secured to the arms, 94, of the bed, 53, and their central portions bowed or bent upwardly so as to contact with side-projections, 96, on the horizontal bars, 83, and by frictional contact therewith act as a brake to prevent said box from moving during said preliminary movement of the cut-off frame. When the cut-off or outer frame has moved sufficiently to completely close the inlet to one compartment and the outlet from the other compartment its further movement will cause its end wall to contact or impinge against the measuring box or the devices on its end, said further movement of the cut-off frame will then carry the measuring box with it until it completes its stroke. As soon as the cut-off frame and the measuring box begin to move together then one compartment will begin to fill and the other will begin to empty. By this construction at no instant can two compartments be either filling or emptying at the same time and the result is that the quantity or material discharged into the individual hoppers is accurately measured.

In order to limit the movement of the measuring box and to adjust its stroke accurately I provide a stationary bar, 97, with inwardly-projecting arms, 98, with adjusting screws, 99, which latter contact with said box when the latter reaches the end of its stroke.

In order to cause the reciprocation of the cut-off frame and measuring box the bar, 72, must be oscillated and this is effected in the following manner. The bar, 72, (see Figs. 1 and 13) extends vertically from a bracket, 100, to which it is pivoted and which is bolted at the side of the vertical leg or support, 1, and adjacent the horizontal shaft, 11. At the lower end this bar has a lateral arm, 101, which projects at the rear face of the cam, 45, and the inner end of this arm carries a roller, 102, which travels in a cam-groove, 103, in said cam, 45, as seen in broken lines in Fig. 13, so that as the cam revolves the arm will be raised and lowered and the bar, 72, will be reciprocated. In order to prevent the material in the main hopper, 89, from becoming clogged I provide a device to keep the material in motion while the filling is going on, and this device will now be briefly described, reference being made particularly to Figs. 1 and 2 of the drawing. The upper portion of the vertical shaft, 40, extends through a tube or sleeve, 104, in the wall of the main hopper and the end of said shaft has bearing in a horizontal plate, 105, which extends across the top of the hopper. A sprockwheel, 106, is mounted on the end of said shaft and a chain, 107, passes around said sprocket and also around another sprocket, 108, which is mounted in a bearing, 109, over the center of said hopper. An arm, 110, depends from the center of the sprocket, 108, and projects down into the hopper and the lower end of said arm is curved so that as it revolves in the hopper it will stir the material therein and prevent clogging in the lower end.

In a machine of this character it is important that when the feeding of the cans ceases for any reason, the operation of the measuring device and the cut-off frame will also be stopped, and in order to accomplish this I provide a clutch mechanism that will stop the operation of lever, 72, and also prevent the revolution of the vertical shaft, 40. This mechanism is illustrated in Figs. 1, 6, 7 and 8 of the drawings, and will now be described. The clutch-wheel, 45, is loosely mounted on the horizontal shaft, 11, and said wheel is provided with a horizontally-movable bolt, 112, which is normally pressed outward by a spring, 113, which is carried in a recess at the side of said bolt. At the side of the clutch wheel and fixed so as to revolve with the shaft, 11, is a head, 114, and the face of this head which confronts the bolt, 112, is provided with projections, 115, at diametrically opposite sides with which the bolt on the clutch wheel will engage to impart the rotary motion of the shaft and head to the clutch. A collar, 116, loosely surrounds the head and is provided with horizontal pins or trunnions, 117, at opposite sides. A swinging bracket, 118, is pivoted to the upper portion of the frame, 42, and said frame is pivotally connected to the trunnions of the collar, 116, and said bracket extends below said collar and has a lateral arm, 119, which projects forward and below the clutch wheel, 45. A cam, 120, is on the lower end of the vertical shaft, 40, and has two circumferential notches or recesses, 121. This cam has position directly in front of the arm, 119, of the swinging bracket. An operating lever, 122, is pivoted at its lower end to the frame, 42, and a link, 123, connects the said lever with the swinging bracket, 118. It will be understood that in order to stop the operation of the bar, 72, and the measuring devices the revolution of the clutch wheel must be stopped and this is accomplished by drawing the upper end of the operating lever, 122, and the link, 123 outwardly. This movement of the link will cause the collar, 116, to slide over the head, 114, and push the bolt, 112, in toward the clutch wheel so as to disengage it from the projection, 115, on the head and to hold said bolt thus depressed so the head can revolve free of the bolt. It will be seen that while the bracket, 118, is swung out to release the clutch wheel the arm, 119, will project into one of the notches, 121, in the cam, 120, and stop the revolution of said cam and also the shaft, 140, and thus discontinue feeding cans. It is obvious that when the clutch wheel is brought to rest the bar, 72, will cease to reciprocate and the measuring devices will also be at rest. After the peas, beans or berries have been measured and deposited in the individual hoppers it is necessary to apply a small quantity of brine or syrup and in order that this liquid may be discharged only when a can is beneath the individual hoppers to receive it, I have provided devices to effect this operation, which devices will now be described, reference being made to Figs. 1, 2, 3 and 12 of the drawings.

In the machine shown in the drawings I have preferably provided two liquid supply devices with adjustable valves so as to properly regulate the discharge at each operation. As both of these devices are alike a description of one of them is deemed sufficient. At one side of the machine, and in the present instance diametrically opposite the feed-in point, the table supports a vertical frame or bracket, 125, which sustains a vertical shaft, 126, the upper end of which carries a circular wheel, 127, which is provided with a plurality of cam surfaces, 128. The lower end of this vertical shaft, 126, is provided with a star wheel, 129, having a plurality of radial arms which project horizontally over the table and in the path of the cans.

A tubular valve-casing, 130, is sustained vertically at the upper end of the bracket, 125, and the lower discharge-end, 131, of said casing has position in a plane just above the individual hoppers. A liquid-supply pipe, 132, enters the lower end of the casing and said pipe is supplied with liquid from any suitable reservoir or tank, which is not deemed necessary to be shown. A valve-stem, 133, (see Fig. 12) extends vertically through the casing and is provided with a valve, 134, at its lower end which closes the discharge end of the casing. A collar, 135, on the stem serves as a seat for the lower end of a spiral spring, 136, while the upper end of said spring is held compressed by seating against the bottom of a cap plate, 137, at the upper end of the casing. An arm, 138, is provided on the cap plate and a lever, 139, with a circular opening, 140, has one end pivoted to said arm while its other end projects between vertical guides and is provided with a roller, 141, which travels over the cam surfaces, 128, of the circular wheel. As the wheel, 127, turns its cam-surfaces will cause the lever, 139, to rise and fall. A sleeve, 142, is pivotally mounted in the circular opening, 140, of the lever and the upper end of the valve-stem passes loosely through said sleeve and is provided with screw threads on which a sprocket wheel, 143, screws. When this sprocket wheel is screwed down on the stem until it contacts with the sleeve it has been adjusted so as to cause the valve, 134, to be opened to its fullest extent when the lever, 139, is raised. By adjusting the wheel on the stem the vertical movement of the valve may be changed, so as to keep said valve open a longer or shorter period, and thus permit more or less liquid escape at the bottom. As there are two valves it is desirable that they be adjusted alike and in order to accomplish this I pass a chain, 144, around both of them that they may be turned alike during the adjusting operation. It will be understood that as the cans arrive at the star wheels, 129, the latter will be given a partial turn and the shaft, 126, and wheels, 127, will also be partially rotated. This movement will be sufficient to cause the roller, 141, and lever, 139, to be elevated and dropped and the elevation and dropping of said lever will cause the valve stem also to raise and drop, thus opening and closing the valves, 134. When no can is beneath a hopper the valve device will not be operated. It is also to be understood that the sprocket chain permits one valve to open and close independently of the other. After the filled cans pass the liquid device they will be conveyed in the path of a chain carrier, 145, which will draw them from beneath the hoppers, and convey them to any desired point.

Having thus described my invention what I claim as new and desire to secure by Letters Patent is,—

1. A can-filling machine having a device to sustain the cans; a plurality of individual hoppers; a reciprocating measuring receptacle above the hoppers; a stirrer in each hopper; a circular rack; means for operatively connecting the stirrer with the rack, and means whereby all the hoppers, stirrers, and rack may be raised or lowered simultaneously to adjust their position between the can-sustaining device and the reciprocating receptacle.

2. A can-filling machine having a stationary can-table; a post extending above the table; a vertically movable support on the post near the table and having circumferential screw-threads; a ring seated on the table and having screw-threads to engage the threads on the support, and a carrier and gear mounted on the post and sustained by the support.

3. A can-filling machine having a plurality of individual hoppers traveling in an endless path; means for sustaining the cans with their open ends adjacent the hopper outlets; a stirrer arm depending from the upper end of each of said hoppers, and means for operating said arms as the hoppers travel.

4. A can-filling machine having a plurality of individual hoppers traveling in an endless path; means for sustaining the cans with their open ends adjacent the hopper outlets; a vertical shaft in each hopper; a stirrer arm depending into the hopper from each shaft, and means for revolving said vertical shafts and arms as the hoppers travel.

5. A can-filling machine having a can table; a hopper carrier above the table; a plurality of hoppers sustained by said carrier; means for revolving said carrier; a stirrer arm in each hopper; means on the exterior of the hopper for operating the stirrer arms, and means for vertically adjusting the position of the hoppers with respect to the can table.

6. A can-filling machine having a can-table; a hopper carrier above the table; a plurality of hoppers sustained by said carrier; a horizontal shaft in each of said hoppers; a pinion on each shaft at the side of the hoppers; a vertical shaft also in each hopper; gears in each hopper to connect the two shafts therein; a stirrer arm carried by the vertical shaft of each hopper, and a rack with which all of the pinions mesh.

7. A can-filling machine having a main hopper with a single discharge outlet; a plurality of individual hoppers traveling beneath the main hopper; a measuring device interposed between the main and individual hoppers and having two compartments; cut-off slides operating at opposite sides of the measuring device and means for reciprocating said measuring device and slides in a horizontal plane between said hoppers whereby to receive a measured quantity of material in one compartment from the main hopper and to simultaneously discharge a like quantity from the other compartment into one of the individual hoppers.

8. A can-filling machine having a main hopper with a single discharge outlet; a measuring device below the main hopper and having two compartments; a slide frame operating at opposite sides of the measuring device; a plurality of traveling individual hoppers below the slide frame; a stationary hopper device interposed between the slide frame and the traveling individual hoppers for directing the material into the latter, and means for reciprocating the measuring device and slide frame so that one compartment may be registered at a time with the single outlet of the main hopper while the compartment out of register with the main hopper may discharge its contents.

9. A can-filling machine having a main hopper with a single outlet; a cut-off frame movable beneath the hopper; a measuring device movable in the cut-off frame, and means for operating the frame to close communication between the single outlet of the hopper and the measuring device and to open an outlet from the measuring device.

10. A can-filling machine having a main hopper; a cut-off frame movable beneath the hopper; a measuring device in said frame; means for first moving the frame independently of the measuring device to close communication between the hopper and measuring device, and means for moving both the frame and the measuring device to discharge the contents from the latter.

11. A can-filling machine having a main hopper; a cut-off frame movable beneath the hopper; a measuring device in said frame, and means for moving the frame a partial stroke independently of the measuring device to close the inlet to the latter and then by a further stroke to open the outlet from the measuring device.

12. A can-filling machine having a main hopper; a cut-off frame movable beneath the hopper; a measuring device in said frame; means for holding the measuring device stationary while the cut-off closes the inlet to it and means for moving the measuring device and frame together to open the outlet from the measuring device.

13. A can-filling machine having a main hopper; a cut-off frame movable beneath the hopper; a measuring device in said frame and having two compartments; means for moving said frame to close the inlet of one compartment and the outlet of the other compartment of the measuring device, and means for moving the frame and measuring device together to open the outlet of the first compartment and the inlet of the other.

14. A can-filling machine having a main hopper; a cut-off frame below the hopper and having two spaced-apart openings in its upper side and a single opening in its bottom; a measuring device open both at the top and bottom and having two compartments,—said measuring device having position between the top and bottom openings of the frame, and means for operating the frame to alternately open and close the compartments.

15. A can-filling machine having a main hopper; a cut-off frame below the hopper and having two openings to alternately register with the hopper opening and a single opening in its bottom; a measuring device movable with the frame and having two compartments to alternately register with the frame openings; means for moving the frame independently of the measuring device to close filling communication between the hopper and one compartment and to cut off the outlet from the other compartment, and means for moving the measuring device and frame together to open the outlet of the filled compartment and to open the inlet of the empty compartment.

16. A can-filling machine having a main hopper; a plurality of traveling individual hoppers; a measuring device having two compartments between the main hopper and individual hoppers; a cut-off frame movable at opposite sides of the measuring device, and means for moving said frame to establish communication between one compartment and the main hopper and to establish communication between the other compartment and one of the individual hoppers.

17. A can-filling machine having a main hopper; a measuring receptacle beneath the main hopper and having movable walls at opposite sides; means for operatively connecting all the movable walls of the measuring receptacle whereby they may all be adjusted simultaneously to vary the capacity of the measuring device, and means for moving the measuring receptacle with respect to the hopper to first fill and then discharge the measured contents.

In testimony whereof I affix my signature in presence of two witnesses.

CHARLES H. AYARS.

Witnesses:
W. T. HILLIARD,
CHAS. C. TICE.